United States Patent
Dickelman

(10) Patent No.: US 9,881,131 B1
(45) Date of Patent: Jan. 30, 2018

(54) COMPUTER AUTOMATED SYSTEMS, DEVICES AND METHODS FOR DATA PROCESSING OF ACCOUNTING RECORDS

(71) Applicant: U.S. Bank National Association, Cincinnati, OH (US)

(72) Inventor: Mark Dickelman, Inverness, IL (US)

(73) Assignee: U.S. Bank National Association, Cincinnati, OH (US)

( * ) Notice: Subject to any disclaimer, the term of this patent is extended or adjusted under 35 U.S.C. 154(b) by 0 days.

(21) Appl. No.: 15/089,780

(22) Filed: Apr. 4, 2016

Related U.S. Application Data

(62) Division of application No. 12/131,597, filed on Jun. 2, 2008, now abandoned.

(60) Provisional application No. 60/991,379, filed on Nov. 30, 2007.

(51) Int. Cl.
| | | |
|---|---|---|
| *G06Q 40/00* | (2012.01) | |
| *G06F 19/00* | (2011.01) | |
| *G06Q 20/10* | (2012.01) | |
| *G06Q 20/20* | (2012.01) | |

(52) U.S. Cl.
CPC .......... *G06F 19/328* (2013.01); *G06Q 20/10* (2013.01); *G06Q 20/204* (2013.01)

(58) Field of Classification Search
CPC ....................................................... G06F 3/48
See application file for complete search history.

(56) References Cited

U.S. PATENT DOCUMENTS

| | | | |
|---|---|---|---|
| 78,783 A | | 6/1868 | Bosart |
| 5,287,267 A | * | 2/1994 | Jayaraman ............. G06Q 10/06 705/28 |
| 5,315,509 A | * | 5/1994 | Natarajan ............. G06Q 10/06 700/105 |
| 5,365,425 A | * | 11/1994 | Torma ................. G06F 19/3437 705/2 |
| 5,381,332 A | * | 1/1995 | Wood ..................... G06Q 10/06 705/7.25 |
| 5,426,281 A | | 6/1995 | Abecassis |
| 5,450,317 A | * | 9/1995 | Lu .......................... G06Q 10/06 705/28 |
| 5,465,206 A | | 11/1995 | Hilt et al. |
| 5,596,642 A | | 1/1997 | Davis et al. |
| 5,596,643 A | | 1/1997 | Davis et al. |
| 5,649,117 A | | 7/1997 | Landry |
| 5,649,118 A | | 7/1997 | Carlisle et al. |
| 5,650,604 A | | 7/1997 | Marcous et al. |
| 5,717,989 A | | 2/1998 | Tozzoli et al. |

(Continued)

*Primary Examiner* — Chika Ojiaku
(74) *Attorney, Agent, or Firm* — Crawford Maunu PLLC

(57) ABSTRACT

Devices, systems, methods and arrangements are implemented in variety of manners. In a specific instance, a computer arrangement implements the following operations for a transaction involving a plurality of merchant offerings that are parseable by merchant offering identifiers. For a plurality of identified buyer accounts from which monetary payables (e.g., cash, credit and/or debit limits) are tracked, stored data sets are accessed that are indicative of types of merchant offerings to be associated with particular ones of the plurality of buyer accounts. Payment is facilitated for the items as a function of at least one of the plurality of buyer accounts. Payment is tracked for the items as a function of the merchant offering identifiers.

16 Claims, 7 Drawing Sheets

(56) References Cited

U.S. PATENT DOCUMENTS

| | | | |
|---|---|---|---|
| 5,737,727 A * | 4/1998 | Lehmann | G06Q 10/06 705/7.13 |
| 5,745,880 A * | 4/1998 | Strothmann | G06Q 10/06375 700/90 |
| 5,793,632 A * | 8/1998 | Fad | G06Q 10/06 700/90 |
| 5,848,394 A * | 12/1998 | D'Arrigo | G06Q 10/0631 705/7.12 |
| 6,070,150 A | 5/2000 | Remington et al. | |
| 6,105,009 A | 8/2000 | Cuervo | |
| 6,292,789 B1 | 9/2001 | Schutzer | |
| 6,298,335 B1 | 10/2001 | Bernstein | |
| 6,381,610 B1 * | 4/2002 | Gundewar | G06Q 10/06 |
| 6,473,740 B2 | 10/2002 | Cockrill et al. | |
| 6,529,187 B1 | 3/2003 | Dickelman et al. | |
| 6,701,303 B1 | 3/2004 | Dunn et al. | |
| 6,847,953 B2 | 1/2005 | Kuo | |
| 7,020,621 B1 * | 3/2006 | Feria | G06Q 10/06375 705/1.1 |
| 7,092,913 B2 | 8/2006 | Cannon | |
| 7,174,302 B2 | 2/2007 | Patricelli et al. | |
| 7,225,156 B2 | 5/2007 | Fisher et al. | |
| 7,280,981 B2 | 10/2007 | Huang et al. | |
| 7,383,223 B1 | 6/2008 | Dilip et al. | |
| 7,392,934 B2 | 7/2008 | Hahn-Carlson et al. | |
| 7,464,859 B1 | 12/2008 | Hawkins | |
| 7,584,151 B2 | 9/2009 | Wells et al. | |
| 7,590,557 B2 | 9/2009 | Harrison et al. | |
| 7,627,523 B1 | 12/2009 | Symonds et al. | |
| 7,661,586 B2 | 2/2010 | Robbins et al. | |
| 7,664,690 B2 | 2/2010 | Dirnberger et al. | |
| 7,668,771 B1 | 2/2010 | Bent et al. | |
| 7,668,772 B1 | 2/2010 | Bent et al. | |
| 7,672,886 B2 | 3/2010 | Bent et al. | |
| 7,672,901 B1 | 3/2010 | Bent et al. | |
| 7,680,679 B1 | 3/2010 | Patricelli et al. | |
| 7,702,530 B2 | 4/2010 | Pearson | |
| 7,702,553 B1 | 4/2010 | Dickelman | |
| 7,702,577 B1 | 4/2010 | Dickelman | |
| 7,711,621 B2 | 5/2010 | Huang et al. | |
| 7,814,015 B2 | 10/2010 | Benedyk et al. | |
| 7,831,490 B2 | 11/2010 | Modigliani et al. | |
| 7,905,399 B2 | 3/2011 | Barnes et al. | |
| 8,015,084 B1 | 9/2011 | Hirka et al. | |
| 2001/0014878 A1 | 8/2001 | Mitra et al. | |
| 2001/0034771 A1 | 10/2001 | Hutsch et al. | |
| 2002/0002495 A1 | 1/2002 | Ullman | |
| 2002/0007298 A1 * | 1/2002 | Jim | G06Q 10/06 705/7.15 |
| 2002/0069244 A1 | 6/2002 | Blair et al. | |
| 2002/0111886 A1 | 8/2002 | Chenevich | |
| 2002/0111915 A1 | 8/2002 | Clemens et al. | |
| 2002/0111916 A1 | 8/2002 | Coronna | |
| 2002/0145051 A1 | 10/2002 | Charrin | |
| 2002/0184147 A1 | 12/2002 | Boulger | |
| 2003/0009382 A1 | 1/2003 | D'Arbeloff et al. | |
| 2003/0061157 A1 | 3/2003 | Hirka et al. | |
| 2003/0061216 A1 | 3/2003 | Moses | |
| 2003/0061229 A1 | 3/2003 | Lusen et al. | |
| 2003/0105688 A1 | 6/2003 | Brown et al. | |
| 2003/0126094 A1 | 7/2003 | Fisher et al. | |
| 2003/0200179 A1 | 10/2003 | Kwan | |
| 2003/0212632 A1 | 11/2003 | Keogh et al. | |
| 2003/0225619 A1 | 12/2003 | Dokken et al. | |
| 2004/0024703 A1 | 2/2004 | Roskind | |
| 2004/0030657 A1 | 2/2004 | Holm-Blagg et al. | |
| 2004/0042470 A1 | 3/2004 | Cooper et al. | |
| 2004/0044621 A1 | 3/2004 | Huang et al. | |
| 2004/0083092 A1 | 4/2004 | Valles | |
| 2004/0093302 A1 | 5/2004 | Baker et al. | |
| 2004/0167852 A1 | 8/2004 | Cutler et al. | |
| 2004/0236632 A1 | 11/2004 | Maritzen et al. | |
| 2005/0010394 A1 | 1/2005 | Bergeron et al. | |
| 2005/0010428 A1 | 1/2005 | Bergeron et al. | |
| 2005/0033583 A1 | 2/2005 | Bergeron et al. | |
| 2005/0033605 A1 | 2/2005 | Bergeron et al. | |
| 2005/0060579 A1 | 3/2005 | Dickelman et al. | |
| 2005/0077350 A1 | 4/2005 | Courtion et al. | |
| 2005/0080691 A1 | 4/2005 | Holm-Blagg | |
| 2005/0198174 A1 | 9/2005 | Loder et al. | |
| 2005/0222961 A1 | 10/2005 | Staib et al. | |
| 2005/0267840 A1 | 12/2005 | Holm-Blagg et al. | |
| 2005/0274792 A1 | 12/2005 | Hahn-Carlson et al. | |
| 2006/0036541 A1 | 2/2006 | Schleicher | |
| 2006/0089906 A1 | 4/2006 | Rowley | |
| 2006/0116957 A1 | 6/2006 | May et al. | |
| 2006/0173672 A1 | 8/2006 | Bergeron et al. | |
| 2007/0017976 A1 | 1/2007 | Peyret et al. | |
| 2007/0038577 A1 | 2/2007 | Werner et al. | |
| 2007/0061255 A1 | 3/2007 | Epting et al. | |
| 2007/0112671 A1 | 5/2007 | Rowan | |
| 2007/0168910 A1 | 7/2007 | Radford et al. | |
| 2007/0174160 A1 | 7/2007 | Solberg et al. | |
| 2007/0175985 A1 | 8/2007 | Barnes et al. | |
| 2007/0179873 A1 | 8/2007 | Solberg et al. | |
| 2007/0233597 A1 | 10/2007 | Petersen et al. | |
| 2007/0282743 A1 | 12/2007 | Lovelett et al. | |
| 2008/0014908 A1 | 1/2008 | Vasant | |
| 2008/0015985 A1 | 1/2008 | Abhari et al. | |
| 2008/0021813 A1 | 1/2008 | Simpson et al. | |
| 2008/0025572 A1 | 1/2008 | Schneider et al. | |
| 2008/0046358 A1 | 2/2008 | Holm-Blagg et al. | |
| 2008/0046366 A1 | 2/2008 | Bemmel et al. | |
| 2008/0097783 A1 | 4/2008 | Iannacci | |
| 2008/0103968 A1 | 5/2008 | Bies et al. | |
| 2008/0103985 A1 | 5/2008 | Huang et al. | |
| 2008/0109320 A1 | 5/2008 | Kleinhans | |
| 2008/0154773 A1 | 6/2008 | Ranzini et al. | |
| 2008/0162295 A1 | 7/2008 | Bedier | |
| 2008/0201769 A1 | 8/2008 | Finn | |
| 2008/0218338 A1 | 9/2008 | Schoettle | |
| 2008/0275748 A1 | 11/2008 | John | |
| 2008/0306838 A1 | 12/2008 | Fleet et al. | |
| 2008/0307034 A1 | 12/2008 | Fleet et al. | |
| 2009/0030848 A1 | 1/2009 | Wendel | |
| 2009/0112747 A1 | 4/2009 | Mullen et al. | |
| 2009/0112766 A1 | 4/2009 | Hammad et al. | |
| 2009/0228336 A1 | 9/2009 | Giordano et al. | |
| 2010/0169214 A1 * | 7/2010 | Nonni | G06Q 20/12 705/44 |
| 2010/0211499 A1 | 8/2010 | Zanzot et al. | |
| 2011/0093324 A1 * | 4/2011 | Fordyce, III | G06Q 20/10 705/14.27 |
| 2011/0101092 A1 | 5/2011 | Fernandez | |
| 2011/0167002 A1 | 7/2011 | Balasubramanian et al. | |
| 2012/0072347 A1 | 3/2012 | Conway | |
| 2013/0124263 A1 * | 5/2013 | Amaro | G06Q 30/02 705/7.34 |

* cited by examiner

COMPUTER AUTOMATED SYSTEMS, DEVICES AND METHODS FOR DATA PROCESSING OF ACCOUNTING RECORDS

RELATED PATENT DOCUMENTS

This patent document is a divisional under 35 U.S.C. § 120 of U.S. patent application Ser. No. 12/131,597 filed on Jun. 2, 2008, which claims the benefit under 35 U.S.C. § 119(e) of U.S. Provisional Patent Application Ser. No. 60/991,379, entitled "Control System Arrangements and Methods for Disparate Network Systems" to Dickelman, Mark and filed on Nov. 30, 2007, and which is fully incorporated herein by reference as describing and illustrating subject matter (in part(s) or in its entirety) that can be practiced with the subject matter disclosed herein.

FIELD OF THE INVENTION

This invention relates generally to computer-automated devices, systems and methods relating to data processing involving accounting records, and as an example, to systems and methods for automated computer systems and networks implemented as may be found in a control center of a financial institution.

BACKGROUND

Computer systems and networks that process accounting data in a control center of financial institutions have struggled to keep up with the ever increasingly complex and expanding variety of electronic accounting data. Accounting data can include data relating and leading up to implementations of payment systems and associated networks. More and more transactions are accomplished without direct payment (e.g., cash) from the buyer to the merchant/seller. Generally, these associated networks involve two primary components. The first component is a seller access network (e.g., Nova®) that provides connection to the point-of-sale (POS) devices (either directly or via merchant internal networks) and identification of the type of payment account (e.g., Visa® or Voyager®). A second component includes payment processing networks that process payment instructions based on established agreements by the participants. Generally, these payment processing networks are one of two different categories, proprietary networks (e.g., Voyager®) or association networks. Examples of association networks include the networks provided by VISA® and MASTERCARD® and/or the particular acquiring/issuing banks. For a particular transaction, the operator of the association network controls the flow of funds for the transaction. Often, this includes a fee that is passed on to the seller, such as a percentage of the transaction. The participating sellers have an agreement with the network (e.g., VISA or MASTERCARD), but do not have a transactional relationship between one another with respect to the association network transactions.

Such transactions are often implemented where the seller has an existing relationship with a bank. The seller sends the transaction information to this bank, sometimes referred to as the acquiring bank. The acquiring bank can forward the payment information to a bank that issued the card, sometimes referred to as the issuing bank. Often the payment processing networks assign interchange fees that are paid between the parties based on the type of transaction, authentication and location. These fees may be passed on to the seller.

An example of a proprietary network is a merchant-provided in-store credit or debit account. The seller, or a seller contracted third party, handles the settlement, authorization and/or other functions associated with a transaction. In some instances, the seller can form bilateral agreements with other sellers to allow use of one network by multiple sellers or to coordinate use of multiple networks between multiple sellers. The sellers establish the bilateral agreements with one another to allow such functionality. For instance, two department stores may allow use of the same proprietary network card at either store or they may allow use of two different proprietary network cards (i.e., one from each store) at either store.

A few networks allow for a single (multi-purpose) card to provide access to more than one account. The card interfaces with a network that would otherwise support one or more of the accounts. The cardholder designates a desired account to use. The transaction is processed as if the card associated with the desired account had been used. Thus, the underlying transactional functions operate in much the same manner as if the original card had been used. The buyer must still carry the multi-purpose card for use and can only use the multi-purpose card at locations that support that particular card.

In this complex and ever expanding background of various payment networks, consumers have an increasing number of accounts from which they can access funds for purchases (e.g., credit, debit, insurance, health-savings accounts, money markets, investment and retirement). These accounts can vary with respect to their respective fees, tax implications, interest rates, limitations on withdraw amounts and a number of other properties. Often the consumer is forced to spend considerable time and effort to manage such accounts and associated transactions. For example, considerable time and effort can be expended in determining how to best apply specific transactions and/or purchased items to the various accounts. In some instances, the actual implementation of such a determination can be just as difficult.

SUMMARY

Consistent with an example embodiment, the present invention involves a financial control center that processes data in response to a purchase transaction in which a plurality of data-identifiable items (i.e., merchant offerings such as goods and/or services) are purchased over a payment network. The payment network interfaces with a computer-operated arrangement and one or more financial institutions that oversee different buyer accounts. The control center accesses information about buyers (and in some instances, sellers also) involved in the purchase transaction and their accounts which might be adjusted (e.g., debited) in consideration of the data-identifiable items involved in the transaction. The payment network determines whether the buyer has sufficient funds or credit to cover the transaction amount. If the transaction is authorized, a buyer account is (e.g., actually or effectively) debited for the transaction amount, and the seller is credited for the transaction amount. A payment parser examines the transaction data to parse items according to other buyer accounts for debiting. The associated buyer accounts are debited for the values of the associated items and the corresponding amounts are credited to the originally debited buyer account.

Consistent with one embodiment of the invention, transaction data about a plurality of items (e.g., goods or services) purchased is provided to a payment network along with buyer and/or seller credentials/identification data. A payment parser examines the transaction data to parse items according to other buyer accounts for debiting. The associated buyer accounts are debited for the value of the associated items and any remaining amount can be debited to a default buyer account.

In a particular embodiment of the invention, the payment parser determines whether a particular transaction item qualifies for specific accounts. For example, the account may have requirements on the types of transactions that can be debited (e.g., due to favorable tax treatment of the account). In one instance, the account is a medical account for which only medically related items qualify. Example medical accounts include insurance accounts and health savings accounts (HSAs).

Consistent with an example embodiment of the invention, buyer and/or seller credentials/identification data is provided to a payment network. For a situation where the credential data identifies the same payment network for both the buyer and seller, the transaction can optionally be completed using transfers between accounts held within the same payment network. As another option or for a situation where the buyer and seller do not present credentials that are associated with the same payment network, a disparate network system can process the transaction. Thus, even though the credential does not explicitly identify the buyer and seller as participants in a common payment network, the system can determine that the buyer and seller have an account on a supported payment network.

If accounts held at the same payment network or payment networks with established settlement are not available through the operation of the disparate network system, a common settlement mechanism can be identified allowing for transfer of funds between buyer and seller accounts on disparate networks.

Consistent with one embodiment of the invention, a system facilitates payment between sellers providing goods or services to buyers paying for the goods or services. The payment is provided between disparate payment networks of the buyers and sellers. An interface receives transaction data. The transaction data can include various different types of information, such as a buyer identifier, a seller identifier, a transaction amount, transaction time, transaction type and location of transaction. A payment network selector receives the transaction data from the interface. The payment network selector uses the received transaction data to select a payment network for one of the buyer and seller as a function of respective profile data. A routing arrangement routes at least a portion of the transaction data to the selected payment network and another portion of the transaction data to a disparate payment network. Consistent with the transaction amount, an account held at the selected payment network is either debited or credited and an account held at the disparate payment network is the other of debited or credited.

Consistent with another embodiment of the invention, a system executes payment for transactions between buyers and sellers using profile data that identifies payment accounts and corresponding payment networks available to the buyers and sellers. A transaction interface arrangement receives a transaction request for a transaction between a seller and a buyer. The transaction request includes a buyer identifier, a seller identifier and a transaction amount. An authorization processor that, for the received transaction request, authorizes the transaction by verifying that transaction request meets stored business rules. A payment processor selects at least one of at least two available payment processing networks for use in providing funds for the transaction request using preferences for at least one of the seller and the buyer. A routing arrangement routes payment information regarding the transaction request to the at least one selected payment processing network.

Consistent with another embodiment of the invention, a method is implemented for facilitating payment between buyers and sellers. For each of a plurality of electronic payment requests received from sellers, a number of steps are implemented. Data contained in the request is used to identify a consumer/buyer and a seller. At least one of at least two available payment processing systems are selected for use in providing funds for the payment request using preferences for at least one of the consumer and the seller. Payment to the seller and collection from the buyer are provided as a function of the at least one selected payment processing system.

Consistent with another embodiment of the invention, a method is implemented for executing payment for transactions between consumers and sellers. For each of a plurality of payment requests received from sellers, a number of steps are implemented. Data from the request is used to identify a consumer and seller. Payment is effected to the seller on behalf of the buyer. Specifically, a buyer payment method is identified for providing funds for the payment request as a function of buyer profile information; a seller payment method is identified for providing funds to the seller as a function of seller profile information, and payment to the seller and collection from the buyer are facilitated as a function of the selected buyer and seller payment methods.

Consistent with another embodiment of the invention, a payment system executes payment in an environment involving mobile device users, mobile carriers and financial processing entities. The system uses profile data that characterizes mobile service criteria and financial-account criteria for each mobile device user. A seller interface arrangement receives payment requests from sellers, each payment request includes a mobile device identifier for a particular mobile device user. For each received payment request, an authentication processor authenticates the payment request using the mobile device identifier and profile data for the particular mobile device user. A payment processor approves payment for each authenticated payment request as a function of the profile data for the particular mobile device user. The payment processor also generates and sends electronic payment data for paying the seller for the authenticated payment request and assesses a fee for each payment. A tracking processor tracks payments made on behalf of each mobile device user to facilitate the collection of funds for the payments.

Mobile authentication methods can include, but are not limited to, confirmation of phone presence at retailer (e.g., GPS, E911 and other device-retailer device communication), confirmation to user (e.g., a text message or email) and system initiation (e.g., user must "turn on" mobile payment by activating via phone before seller can send in data to be processed).

Consistent with another embodiment of the invention, a distributed mobile payment system is implemented in an environment involving mobile device users, sellers, mobile carriers and a financial processing entity that contracts with mobile carriers for providing mobile payment. The system has a databank arrangement to store, for each mobile device user, profile data characterizing mobile service criteria and financial processing criteria. The data bank arrangement can also include, for each mobile carrier, profile data characterizing purchasing functions to be carried out on behalf of mobile device user customers of the mobile carrier. A purchase processing arrangement facilitates payment to sellers for mobile device user purchases. The facilitation can include associating received mobile payment requests with a particular mobile user and a particular mobile carrier as a function of mobile device user identification data in the requests; processing mobile payment for each associated mobile payment request by executing computer-readable code specified in profile data for the associated mobile device user and mobile carrier to facilitate payment to the seller sending the payment request and to track payments made on behalf of the mobile device user, and assessing a fee to each seller for payments made to the seller.

Consistent with another embodiment of the invention, a method is implemented for processing payment for transactions between a seller and a mobile device user. A mobile device identifier is used for the mobile device user and a financial processing system to populate and process closed and open network purchase systems for processing payment to sellers on behalf of mobile device users, thereby permitting trustworthy user-seller transactions based upon the mobile device identifier.

The above summary of the present invention is not intended to describe each illustrated embodiment or every implementation of the present invention.

BRIEF DESCRIPTION OF THE DRAWINGS

The invention may be more completely understood in consideration of the detailed description of various embodiments of the invention that follows in connection with the accompanying drawings, in which.

Figure 1:
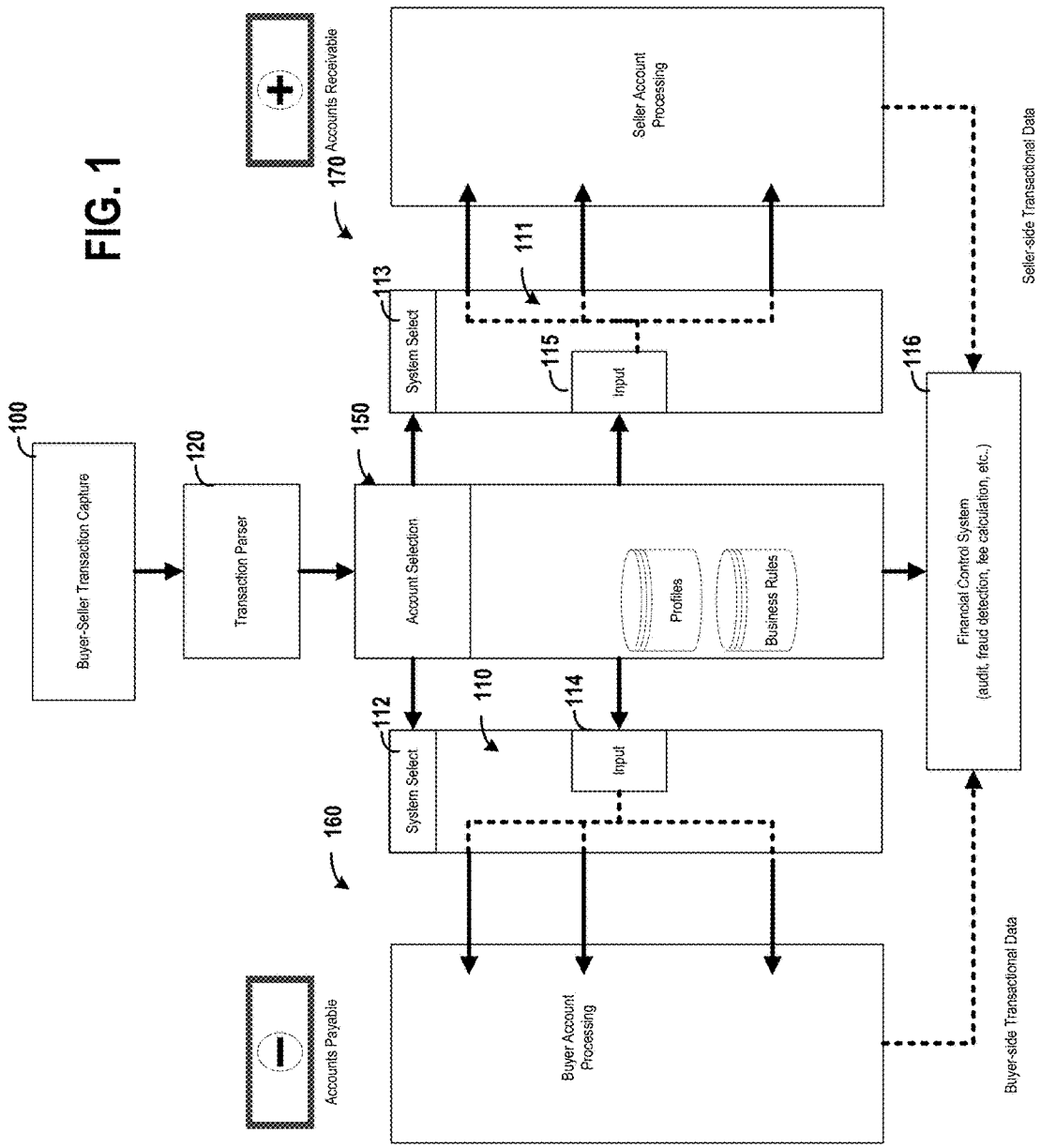
FIG. 1 shows an example of data flow for a control center and processing in response thereto, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Consistent with an embodiment of the present invention, a system or method is implemented to process accounting data and provide output that can be used to facilitate intelligent routing of transaction data to desired accounts. In particular, a data-processing control center responds to a transaction involving a plurality of items (i.e., goods and/or services) parsed into groups that are distinguishable by the type of item. These groups are associated with different buyer accounts from which the funds for the associated items are debited or otherwise accounted for. While the present invention is not necessarily limited to such applications, various aspects of the invention may be appreciated through a discussion of various examples using this context.

According to an example embodiment of the present invention, the data-processing control center processes received data to generate a transaction profile that specifies how the seller is to be credited for the full transaction amount independent of receiving funds from other buyer accounts. In certain instances, the control center generates or acts on transaction profiles. The seller is able to process the transaction much like a conventional transaction (e.g., a credit or debit card purchase). Similarly, at the time of sale the buyer is able to complete the purchase/transaction with the seller without manually parsing the items at the time of purchase by, for example, paying for different items in the transaction using different cards, checks or other account identifiers.

A specific example embodiment of the present invention is designed for use with healthcare products and services. A growing number of account types, insurance options and employee plans provide patients with options in health-related purchases. For example, insurance policies may pay for a portion or all of a policy holders expenses. Such policies can vary greatly in what is covered, how much is covered and other factors such as deductibles. Should the healthcare provider submit an insurance claim on behalf of a patient, the healthcare provider must then wait for the insurance company to approve and provide compensation. If the entire transaction is not approved or compensation is less than for the full amount, then the healthcare provider may need to issue a bill to the patient. Not only is the healthcare provider burdened by the cost of issuing and collecting on such a bill, there can sometimes be a significant delay between the submission to the insurance company and the compensation/approval by the insurance company.

From the patient side, the patient may have several options from which to pay for the healthcare services. These can include, for example, insurance policy claims, health savings accounts and general accounts. The patient may not have an intimate knowledge of all of the options and their associated rules. This could lead to less than ideal selection of how to pay for the healthcare and other goods. Moreover, the patient may have to make multiple transactions for a single purchase. The following situation shows an example of a healthcare purchase using a system and/or method according to an embodiment of the present invention.

A buyer may enter a store that sells a number of different products including prescription medication and non-healthcare products. The buyer wishes to purchase a number of items including prescription medication, nonprescription medication and non-healthcare products. The buyer has an insurance policy that covers some prescription medication, a health savings account that covers most healthcare products including nonprescription medication and a number of general accounts, such as credit or debit accounts. The buyer presents all of the items to the store/seller. The transaction data is collected. The transaction data includes, for example, a cost of each item, universal-product-code (UPC) data and/or a description of the items, such an identification denoting whether the item is (and possibly the type of) prescription medication. The transaction can be completed without the buyer or seller individually parsing out the different items according to accounts associated with the buyer. For example, the buyer may present a single identifier (e.g., an insurance card, a credit card or a debit card) to the seller. This identifier could be associated with any one of the buyer accounts, or merely a buyer identifier (e.g., a driver's license). The system subsequently parses the items into groups using the transaction data and submits the data for the parsed items (hereafter, "parsed item groups") to the corresponding buyer accounts. Unless otherwise indicated, the terms "items," "transaction items" and "parsed items" are used to denote data that identifies the physical items or services involved in the transaction. More specific implementations, other embodiments (e.g., non-healthcare), and variations from this example will become apparent from the discussions and figures herein.

According to an example embodiment of the present invention, a system is implemented for processing the parsed transactions. The system handles routing of the parsed item groups to designated networks and an associated account. Handling of routing can include direct communication with the routing network and/or generation of a payment profile, which is to be implemented by a routing system/network. The system selects networks based upon user profile data and business rule data associated with the designated networks. Transactional data is routed to the selected networks to implement the monetary portion of the transaction. In one instance, the system routes this transactional data in real-time as part of the initial seller-buyer transaction. In another instance, the system first authorizes the transaction against, for example, a default (e.g., credit/debit) account. Assuming the transaction is authorized, the seller is credited for the transaction. The system then parses the transaction items according to preferred buyer accounts. These preferred accounts are debited accordingly.

In one instance, the system can automatically implement the parsing and debiting functions. The system can also be configured to provide a buyer interface for reviewing the implemented functions. While the buyer can review these functions, the buyer need not take affirmative action to carry out the transactions.

In a specific embodiment, the system processes transactions relating to healthcare. The accounts can be, for example, health insurance accounts, health-savings accounts, medical spending accounts and the like.

In another instance, one or more of the debiting steps can be made responsive to buyer input. This input can range from confirmation of a selection suggested by the system to direct selection of the accounts by the buyer. For example, the system can receive input from the buyer as to how to parse the items (e.g., at the POS device or subsequently provided buyer input over the Internet). The buyer could present the system with a suggested parsing of the payments and/or the system could provide a suggested payment profile to the buyer. The suggested payment profile could indicate how the items have been parsed and assigned to buyer networks/accounts. The buyer or system can review, adjust and/or confirm the payment profile. In another example, the system can implement the payment profile without buyer input. The system can still allow the buyer to review the implemented payment profile. In one implementation, the buyer can choose to adjust the implemented payment profile as desired. This can be accomplished, for example, by delaying implementation of the payment profile during an adjustment period. During the adjustment period, the buyer is allowed to modify the payment profile. At the end of the adjustment period, or after the buyer has confirmed the payment profile, the payment profile can be implemented.

Consistent with a specific embodiment of the present invention, the seller need not have direct knowledge of the buyer's selected network(s). In certain instances, the buyer and seller do not have existing agreements with the selected network of the other party.

According to an example embodiment of the present invention, a system is implemented for processing buyer-seller transactions using disparate seller and buyer networks and accounts held therein. The system captures buyer and seller transaction data associated with the sale and purchase of goods or services. In one embodiment of the invention, the system selects a buyer network from a plurality of possible networks. The system routes a portion of the buyer-seller transaction data to the selected buyer network. In a particular instance, the buyer network is a network for which the seller does not have an existing relationship.

In another embodiment of the invention, the system selects a seller network from a plurality of possible networks. The system routes a portion of the buyer-seller transaction data to the selected seller network. In a particular instance, the seller network is a network for which the buyer does not have an existing relationship.

Consistent with one embodiment of the invention, the system selects both a seller network and a buyer network from a plurality of possible networks. The system routes a portion of the buyer-seller transaction data to the selected networks.

Another embodiment of the invention includes the identification of potential accounts in the seller access network on an account-by-account (e.g., Payment Card Account) basis. In certain instances, the identified accounts include accounts for which bilateral agreements do not exist with the payment network associated with the buyer identification of selected payment network.

FIG. 1 shows an example system for implementing a transaction using a payment parser and disparate seller and buyer networks, according to an example embodiment of the present invention. An example of disparate networks includes the instances where the buyer account is not recognized on the seller network. The system can identify the buyer and determine that settlement can occur using a set of rules embodied and processed in the financial control system 116. A buyer wishes to purchase goods and services from a seller. A buyer/seller interface captures transaction data (100) and transmits the data to transaction parsers 120. Transaction parser 120 groups items of the transaction according to transaction types that correspond to one or more networks/accounts. The parsed transactions are sent to network/account selector 150. Network/account selector 150 provides an indication of the selected network(s) to routing blocks 160 and/or 170. Financial control system 116 receives inputs from buyer/seller interface 100 and from the selected networks.

To initiate a transaction, the buyer and seller transactional data is captured, for example, using a buyer-seller interface to read the transaction data. The buyer and seller interfaces could be distinct interfaces or they could be part of the same interface. For instance, the buyer interface could be a card reader, a computer interface for entering identification (e.g., over the Internet) or a smart-card interface. The seller interface could include point-of-sale devices that allow the seller to input data. Examples of interfaces that can receive data from both sellers and buyers include a website or an automated transaction machine, such as a self-service gas pump. There are numerous other possible interfaces, some of which are discussed in further detail herein. The capture of the transactional data (100) includes the buyer identification, the seller identification and the transaction amount. Various other data can also be included, such as time-stamps or security information. Examples of security information include various secondary identifications including, but not limited to, personal pin numbers, biometric data, passwords, social security numbers and authentication via an external communication device, such as via email or a cellular phone.

The transactional data is packaged for sending to two different networks. In one instance, the buyer information (e.g., buyer identification and/or security data) is separated from the seller information (e.g., seller identification and/or security data). This is possible due to the use of different networks by the buyer and seller. In another instance, some or all of the transaction data is duplicated for use by the system. This can be useful for a variety of applications, such as applications in which the buyer and seller networks have bilateral agreements. Further details of such applications are discussed further herein.

Network selector 150 selects a buyer and/or seller network to use in processing the transaction. The network selector compares the buyer or seller identification to a stored list of buyer or sellers. A profile is retrieved for the participant and used in the selection of the network for the participant. The data from the retrieved profile can be applied to a set of business rules to determine the network for the participant. In some instances, the selected network can be determined without knowledge of the other participant. In other instances, a profile of the other participant can also be retrieved and used to select the network. For instance, a particular network may be selected because the seller has a favorable bilateral agreement with a network that is usable by the buyer.

Once a network is selected, the necessary transactional data is sent to the selected network(s) using buyer and/or seller routing systems 160 and 170. Network selections 112 and 113 include data that indicates the proper network to route the transactional data. Inputs 114 and 115 receive the transactional data necessary for the selected network of the buyer and seller, respectively. The routing blocks 110 and 111 use this information to send the proper transactional data to the selected network from the possible networks. A network selected for the seller will process the transaction so as to credit the seller for the value of the transaction. A network selected for the buyer will process the transaction so as to debit/charge the buyer for the value of the transaction.

The settlement between the two networks can be accomplished using a number of different settlement processes. In one example of a settlement process, the networks can directly communicate with one another. This may be the case where the networks have bilateral agreements with each other. The transactional data received by each network can be used to reconcile the debit and credits for a transaction by, for example, matching a transaction identifier received by each network. Such settlement can be done immediately or on a periodic basis (e.g., daily). In the instance of direct communication between networks, the networks may have a number of settlement options of which the overall system is aware. The overall system can use network profiles and/or business rules to determine if the networks are compatible, and if so, which settlement rules to implement. The system can then provide the networks with the proper data to allow the networks to settle the transaction(s) between one another. The data may include information such as an identification of the settlement protocols to use, communication methods or fee calculations. This can be particularly useful for networks that do not have explicit bilateral agreements with one another, but nonetheless, desire to effect settlement directly with one another.

In another example of settlement, the seller and buyer networks do not directly effect settlement with one another. Instead, one or more third parties can be used to effect settlement. For instance, a financial entity 116, such as a bank, can collect from the buyer network while crediting the seller network. The financial entity reconciles the collected and credited amounts. This can be particularly useful for facilitating transactions between networks that are either incompatible or unwilling to interface directly with one another. In another example, the seller and buyer networks may be the same network and the settlement can then be implemented according to a protocol of the selected network.

Each of the selected networks is allowed to process the transaction according to their respectively established protocols. In some cases this includes the billing and reporting functions to the buyer and seller. For example, a credit card network can send a statement to the buyer that includes the transaction amount. The buyer is then obligated to repay the proper party within the credit card network. Likewise, the seller could be credited for the value of the transaction through an appropriate network and notified of the transaction details using a transaction statement/report (mailed, online or otherwise).

In a particular embodiment, a portion of the system is implemented to facilitate population of the system with buyers and/or sellers. Sellers and buyers alike obtain more value as the number of sellers and buyers participating with a specific network increases. For example, sellers are able to offer the purchase options to more buyers, while buyers are able to use the service at more locations/sellers. This network effect often presents a buyer/seller population problem for newly implemented systems as they often do not have a critical mass of buyers and sellers necessary to make the systems valuable.

This population system can include a database of eligible buyers and/or sellers that is used to identify potential new participants in the system. These potential participants can be notified of their eligibility using an acceptable mechanism. For example, the system may detect a purchase placed by a buyer who is a participant in a network associated with the system. The population system can perform a number of different actions with this information. For instance, the identified buyer can be immediately notified of their eligibility. This can be done, for example, by notifying the buyer or seller of the option before the transaction is completed. In some instances, the buyer may be notified of potential savings, or other incentives, should they choose to participate. This can include the option to use one or more preferred accounts associated with a network other than the network that would otherwise be used by the buyer in the instant transaction. In another example, the buyer is notified at a later date. For instance, the buyer could be notified through a targeted mailing or email communication. In another instance, the buyer can be notified of his options in conjunction with a subsequent statement or bill.

For further details regarding systems, methods and arrangements for routing, settlement and auditing between multiple networks and accounts reference can be made to the U.S. Provisional Patent Application Ser. No. 60/991,379, entitled "Control System Arrangements and Methods for Disparate Network Systems," to Dickelman, Mark and filed on Nov. 30, 2007, which forms part of this application and is fully incorporated herein by reference.

Figure 2:
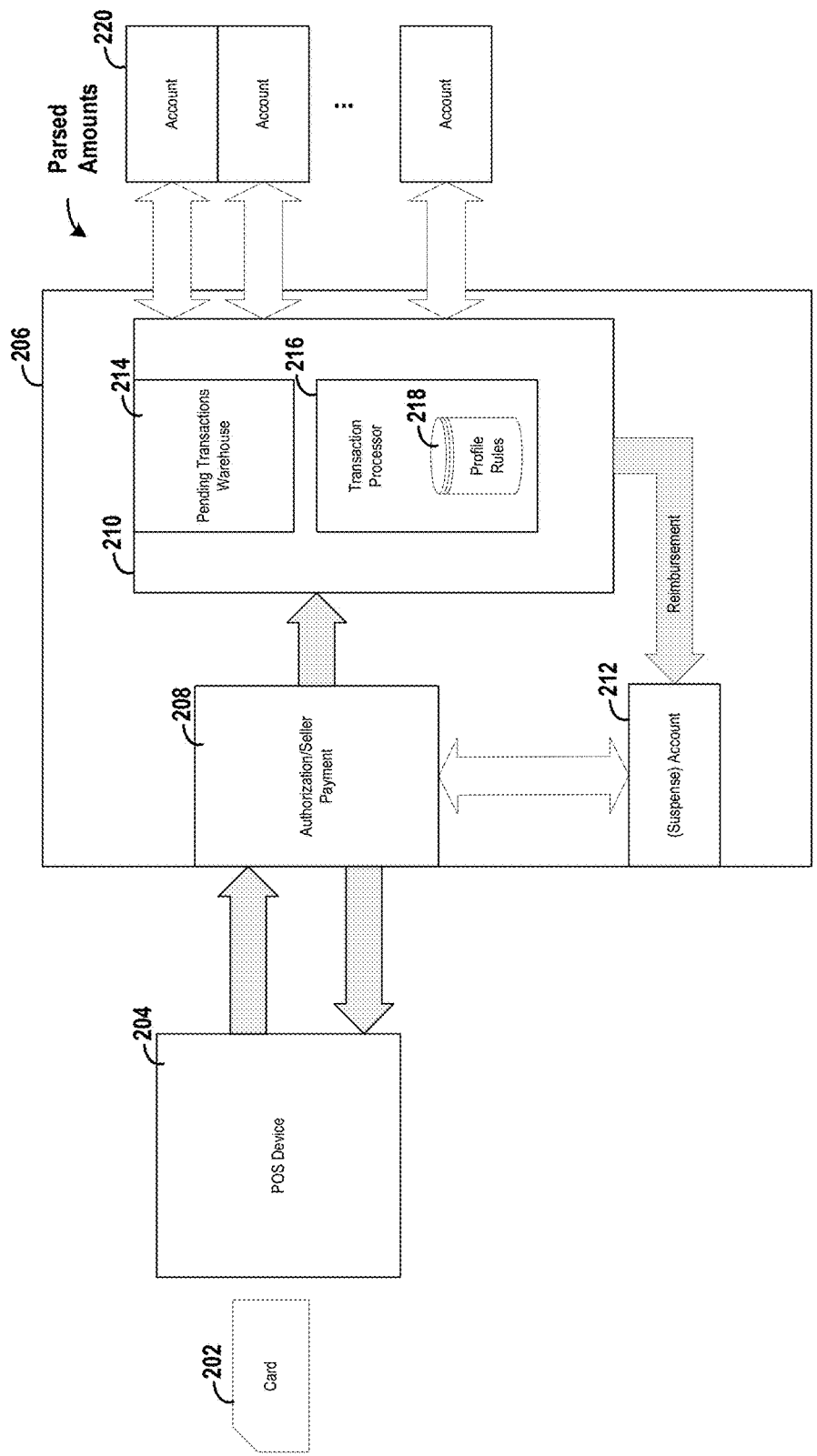
FIG. 2 is a block diagram showing aspects of a data parsing system, consistent with example embodiments of the present invention.

FIG. 2 shows a block diagram for a payment parsing system, according to an example embodiment of the present invention. Buyer/seller transaction data is captured at point-of-sale (POS) device 204. In a specific example, the buyer presents the seller with identification information, such as an identification card 202 (e.g., a debit/credit card). POS device 204 can capture data that identifies properties of items involved in the transaction. The captured data is sent to system 206. System 206 provides authorization and payment to the seller at block 208. The payment can originate from account 212. Account 212 can be implemented in a number of different manners.

In one instance, account 212 is a default account of the buyer. The account 212 is the default account in the sense that the account is suitable for use with all items in the transaction. Example accounts include, but are not limited to, credit card accounts, debit card accounts, savings accounts, checking accounts, pre-paid card accounts and a loan extended by a financial institution.

In another instance, account 212 represents a financial institution's temporary payment on behalf of the buyer. The financial institution can extend temporary credit to the buyer until such a time as the transaction has been parsed and the proper accounts have been debited.

Payment processor 210 receives the transaction data and parses the data into groups of items. The groups of items are determined using a set of profile rules that can be tailored to the specific buyer, the type of transactions and the available accounts 220. The transaction amount relative to the parsed groups of items can then be debited from the appropriate accounts 220. These amounts can then be used to offset the outstanding balance of account 212.

In a specific embodiment, the system can submit a parsed group of items to be debited from a selected account. The account can be selected by transaction processor 216 using various data 218 including, but not limited to, business rules, profile information, transaction-specific information and input from the buyer or seller. A database is used to store the current status of the group of items as represented by pending transaction warehouse 214. Once an account responds to the submission by the system, pending transaction warehouse 214 can be updated accordingly. A selected account may respond in various fashions. In one instance, the selected account determines that the entire transaction amount for the submitted group is covered from the account. In another instance, the selected account determines that the entire transaction amount for the submitted group is not covered from the account. Other examples include partial coverage of the transaction amount or indications of delays in processing the submitted group.

If the entire transaction amount is indicated as being covered by the account, then the default account can be credited for the transaction amount. If the transaction amount is indicated as not being covered (entirely or partially) by the account, then the system can determine if there is another buyer account to which the selected group is to be submitted.

In one instance, the selection of the second account involves use of a sorted list of eligible accounts. The list can be sorted according to business rules that select the most desirable accounts first and the less desirable accounts last. The transaction amounts can be submitted to the accounts in descending order so as to allow the preferred accounts to be used first. For instance, the system first submits transactions information for a group of items to a preferred account. The preferred account provides an indication as to how much, if any, of the transaction amount is acceptable. Any remaining transaction amount can then be submitted to the next account in the sorted list. Alternatively, the system can submit the transaction information to multiple (or all) of the eligible accounts relatively simultaneously. The accounts can indicate how much, if any, of the transaction amount will be accepted. The system can then partition the transaction amount between the various accounts according to the indications.

In another instance, the system submits transaction information about a group of items to a first account that is selected according to a set of business rules and user profile information. Upon receiving, from the first account, an indication regarding details about acceptance of the transaction, the system modifies the status of the group of items accordingly. The system then uses the modified status to select a second account according to a set of business rules and user profile information. This recursive process can be continued until the transaction for the group of items is settled or no eligible accounts remain. This can be particularly advantageous for applications where the indications from the accounts affect the selection of an account. For example, the preferred account may change based upon the amount of the transaction remaining, or in response to some of the items of the group which may have been compensated for by another account. Thus, the recursive nature can be useful for a system that dynamically prioritizes accounts based upon input from one or more accounts.

According to one embodiment of the present invention, parsing of the items can be facilitated using input from the buyer. In one such example, the buyer is able to enter a desired or suggested parsing for the system to implement. In another example, the buyer is able to verify and/or modify a suggested parsing presented by the system.

Figure 3:
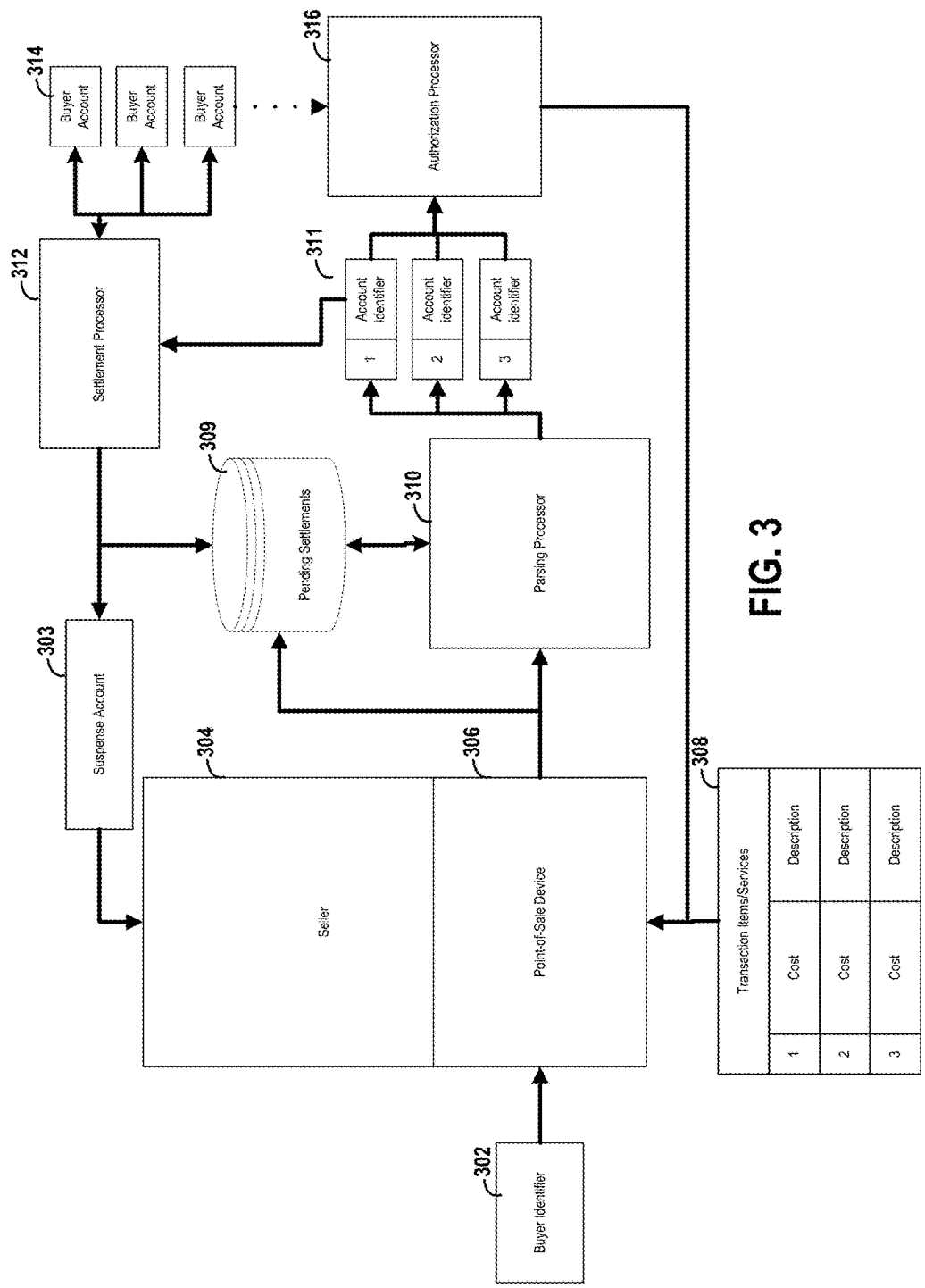
FIG. 3 is a data-flow diagram for a data parsing system, consistent with example embodiments of the present invention.

FIG. 3 shows a flow diagram for transaction data, according to an example embodiment of the present invention. Merchant/Seller 304 accepts a buyer identifier 302 from a buyer desiring to purchase various merchant/seller offerings (e.g., items or services). In one instance, the seller captures information from the buyer identifier 302 and data 308, representing the transaction items, using POS device 306. Alternatively, transaction data 308 can be supplemented by buyer input at a later time (e.g., via a website that allows the buyer to provide parsing information about the transaction). The captured data is sent to parsing processor 310. A suspense account 303 is debited for the transaction. Parsing processor 310 associates the items found in data 308 to buyer accounts to generate parsed data 311. The associated accounts are debited using settlement processor 312. Settlement processor debits the appropriate buyer accounts 314 and credits suspense account 303. Seller 304 is also credited for the transaction amount. Optionally, authorization processor 316 authorizes the transaction by notifying the POS device 306.

Suspense account 303 can be implemented in a variety of manners. For instance, suspense account 303 can be a default account of the buyer. Examples include, but are not limited to, a credit card account or a checking/savings account. In this instance, suspense account 303 is initially debited to pay the seller. If any of the buyer accounts 314 are debited, the amount can be credited to suspense account 303. Optionally, the system could credit another user account. This flexibility allows the buyer to shift funds depending upon various parameters. For instance, the suspense account 303 may be a credit card account. The buyer may desire that rather than crediting this account, the credit should be applied instead to a savings account. One reason for such a transfer is that the buyer may wish to receive interest on the credited amount. Presumably, the buyer would transfer funds from the savings (or another) account prior to the payment due date for the credit card.

Another possibility is that suspense account 303 is a seller account. The seller account represents a temporary extension of credit to the buyer. In such instances, an authorization from the system can be particularly advantageous as it can provide the seller with a level of confidence (e.g., that the buyer has sufficient means to pay for the transaction).

In yet another instance, suspense account 303 is a third party account. For example, if the system is operated, in part, by a financial institution such as a bank, the bank may implement the suspense account 303 on behalf of the buyer. The credit to the seller would come from such an account and the settlement from the buyer accounts would compensate for this credit. In a specific instance, the suspense accounts are implemented as individual accounts for each buyer who enrolls in the system.

Another possibility involves one or more providers of the buyer accounts implementing suspense account 303. In this manner, a provider of an account initially credits the seller. It may be that the provider does not debit the entire amount credited from the buyer's account, leaving an outstanding balance. The provider could directly bill the buyer for the outstanding amount. Alternatively, the provider could notify the system of the outstanding amount. The system could then submit the outstanding balance to another eligible account and/or bill the buyer for the remaining amount.

Database 309 stores data for pending settlements related to various transactions. The system updates the data as accounts 314 are debited. Database 309 is updated according to the debited amounts. In a particular instance, the updated data is processed to parse the transactions again. In this manner, recursive parsing is implemented until the transaction has been settled, no options remain for buyer accounts, or some other threshold criterion is met.

In one instance, authorization processor can receive data about the associated buyer accounts that indicate whether the transaction is valid. This can include, for example, information regarding current account balances, periodic limits on transaction amounts, buyer-defined constraints and/or tax laws.

In various instances, the entire process can be implemented in relatively rapid fashion allowing the seller and buyer authorization and settlement to be completed at the time of the initial transaction. In other instances, portions of the transaction can be completed at a later date. One such instance involves the use of a temporary or default account. This default account can be used to verify the transaction and to pay the seller. The parsing of the items and debiting of the associated accounts can then be accomplished at a later time. Such processing functions can occur on a periodic basis.

Figure 4:
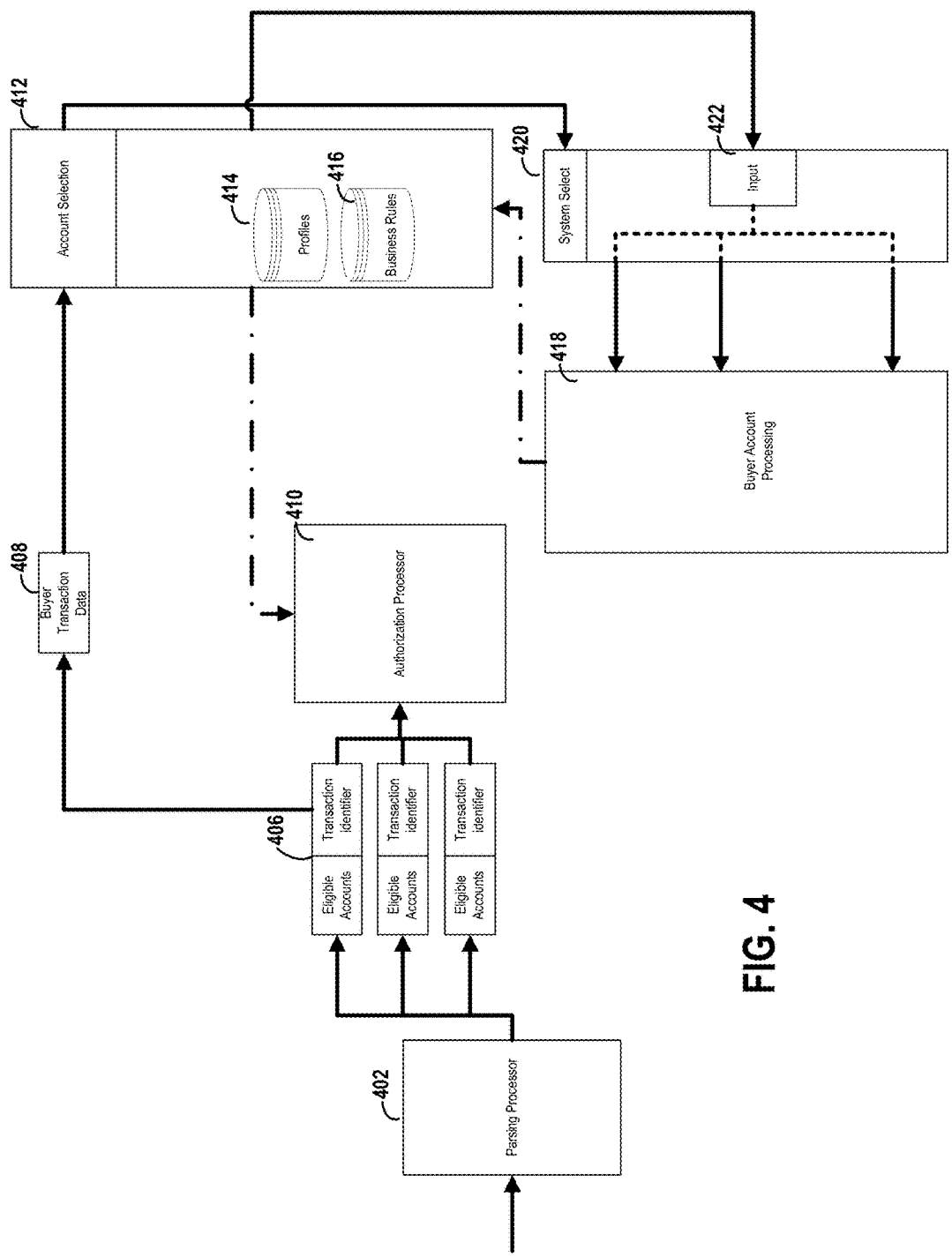
FIG. 4 is a flow diagram for a data parsing system that uses a network routing arrangement, consistent with example embodiments of the present invention.

FIG. 4 shows a flow diagram for processing transaction data to be used by a network routing arrangement, according to an example embodiment of the present invention. Parsing processor 402 receives transaction data that includes a number of different items involved in the transaction. In one implementation, parsing processor 402 can group the items independent of knowledge of the accounts held by the buyer. For example, parsing processor can tag each item with multiple eligibly account types (e.g., insurance claim, health-savings account and credit card). This determination can be made based upon an item identifier (e.g., universal product code (UPC), textual product description or custom identifiers) or upon buyer provided data (e.g., via a website).

Optionally, the parsed transactions 406 can then be sent to an authorization processor 410. Authorization processor 410 can make a determination as to whether the system determines that the transaction is valid. Notification of the determination can then be sent to the seller and buyer.

The parsed buyer transaction data 408 is sent to account selection 412. Buyer profiles 414 and business profiles 416 determine the proper network and account for each transaction item. This can be accomplished, for example, by correlating the eligible accounts indicated by the tag with accounts available to the particular buyer. Additional data can also be used in the determination step. For example, account balances, buyer preferences, associated fees, transaction amount limits, tax implications and account-based interest can each be included into the determination of which account an item is to be assigned. The determined/assigned account is then sent to system select input 420. The transaction data (e.g., transaction amount and account identifier) is sent to input 422. The transaction data is routed to the appropriate buyer account(s) 418 for processing and/or settlement.

Optionally, the selected buyer network can provide feedback to ultimately be used by authorization processor 410 in a determination of whether the transaction is valid.

Figure 5:
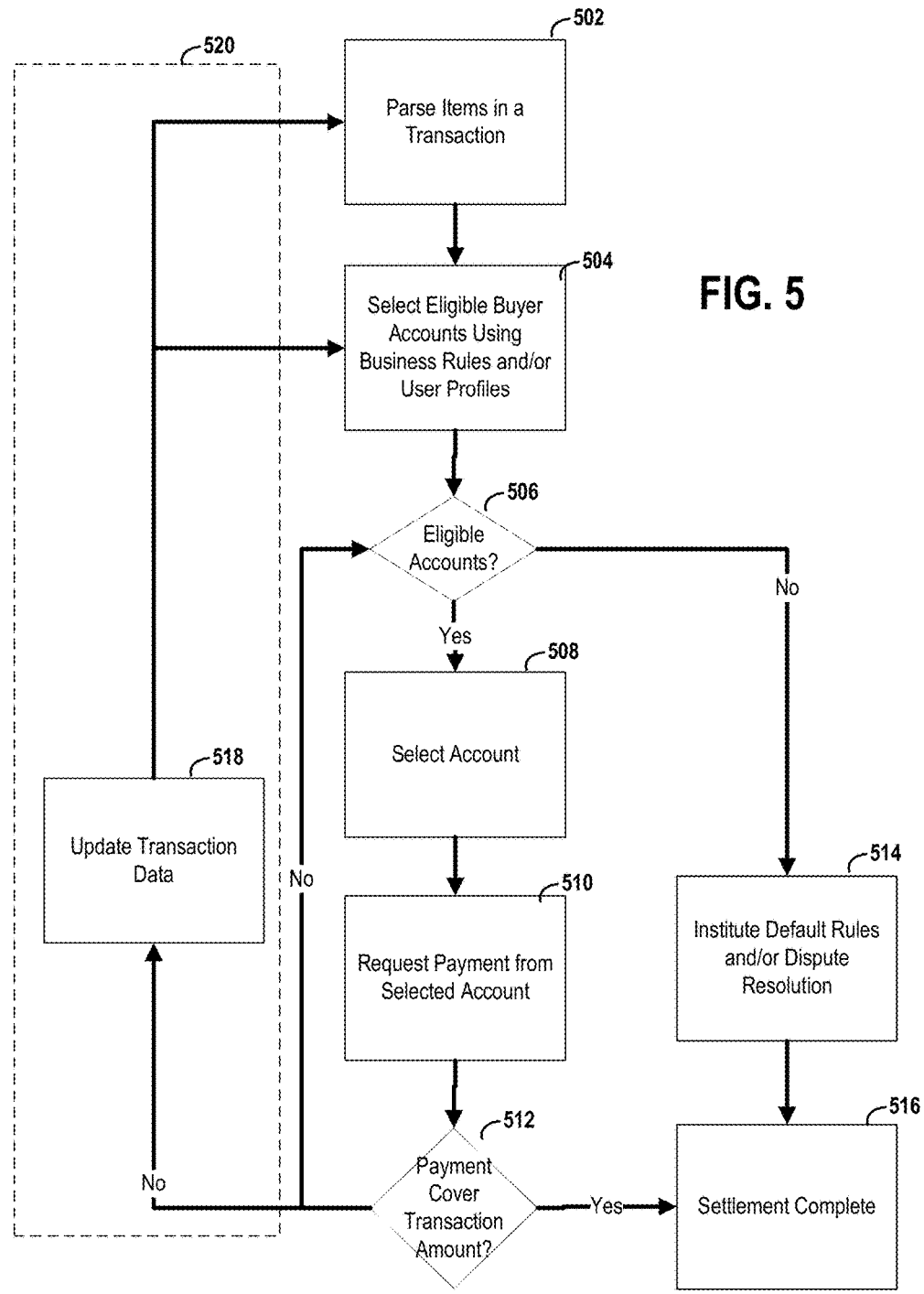
FIG. 5 is a flowchart illustrating an example process that is consistent with an embodiment of the present invention.

FIG. 5 shows a flowchart for a process that is consistent with an example embodiment of the present invention. At step 502, items of a transaction are parsed according to the item types, their costs or other transaction data. The parsed items are associated with one or more eligible buyer accounts at step 504. Assuming there are eligible accounts indicated for a particular group (per decision step 506), the process proceeds to step 508. If there are no eligible accounts and/or payment may not be completely covered, the process can proceed to step 514 to institute default payment rules (e.g., paying from a default account) or dispute resolution/collection.

At step 508, a particular account is selected. This selection step can be accomplished by taking in a number of different parameters and considerations. Example factors include, but are not limited to, the amount of the transaction, known limits of various buyer accounts, tax implications, interest rates and the type of items in the transaction. This process can be particularly useful for allowing modularity in the various components. As an example, when selecting preferred accounts, the system could implement an algorithm that attempts to maximize gains of the buyer. Alternatively, the system could instead implement an algorithm that maximizes gains of the system implementer or the seller. Other possibilities include, but are not limited to, maximal efficiency between all parties, reduced tax implications and predictive algorithms.

In certain embodiments, more than one account can be selected at the same time. The amount of the transaction can be split between multiple buyer accounts, or the entire transaction amount can be sent to each buyer account and actual debits from the accounts can be determined from the responses from the buyer account systems. For example, if the transaction is for $100 and there are 3 potential/eligible accounts, the first approach would involve portioning the $100 between the eligible accounts (e.g., $40 to a first, $60 to a second and $0 to a third). The second approach would send $100 request to each of the 3 buyer accounts. The buyer accounts would respond with an indication of how much, if any, of the transaction amount is approved (e.g., $80 from a first, $50 from a second and $0 from a third). The system could then apportion the $100 between the accounts as desired (e.g., $50 from the first and $50 from the second or $80 from the first and $20 from the second).

At step 510, a request for payment is sent to the selected account(s) and a response is subsequently received.

Decision step 512 depends upon whether or not the entire transaction amount has been covered from the buyer accounts. If it has, the system can complete the transaction processing at step 516. If the entire transaction amount has not been accounted for, the system can return to decision step 506. An optional implementation includes a time-window function. This can be useful, for example, with insurance policy claims that may take several days or even weeks to receive a response. If a response has not been received within the time window, the process can proceed by attempting to debit from another account. The insurance claim can then either be maintained or it can be canceled.

Optionally, the system can implement one of two different paths shown by the dotted area 520. In this optional implementation, the transaction data is updated at step 518. This update can include information received from selected buyer account(s) providers. For example, an account provider may provide a value of the transaction that is acceptable, a list of items that are acceptable/unacceptable or a time-period before any transaction can be authorized. This information can then be used in either or both of steps 502 and 504.

Figure 6:
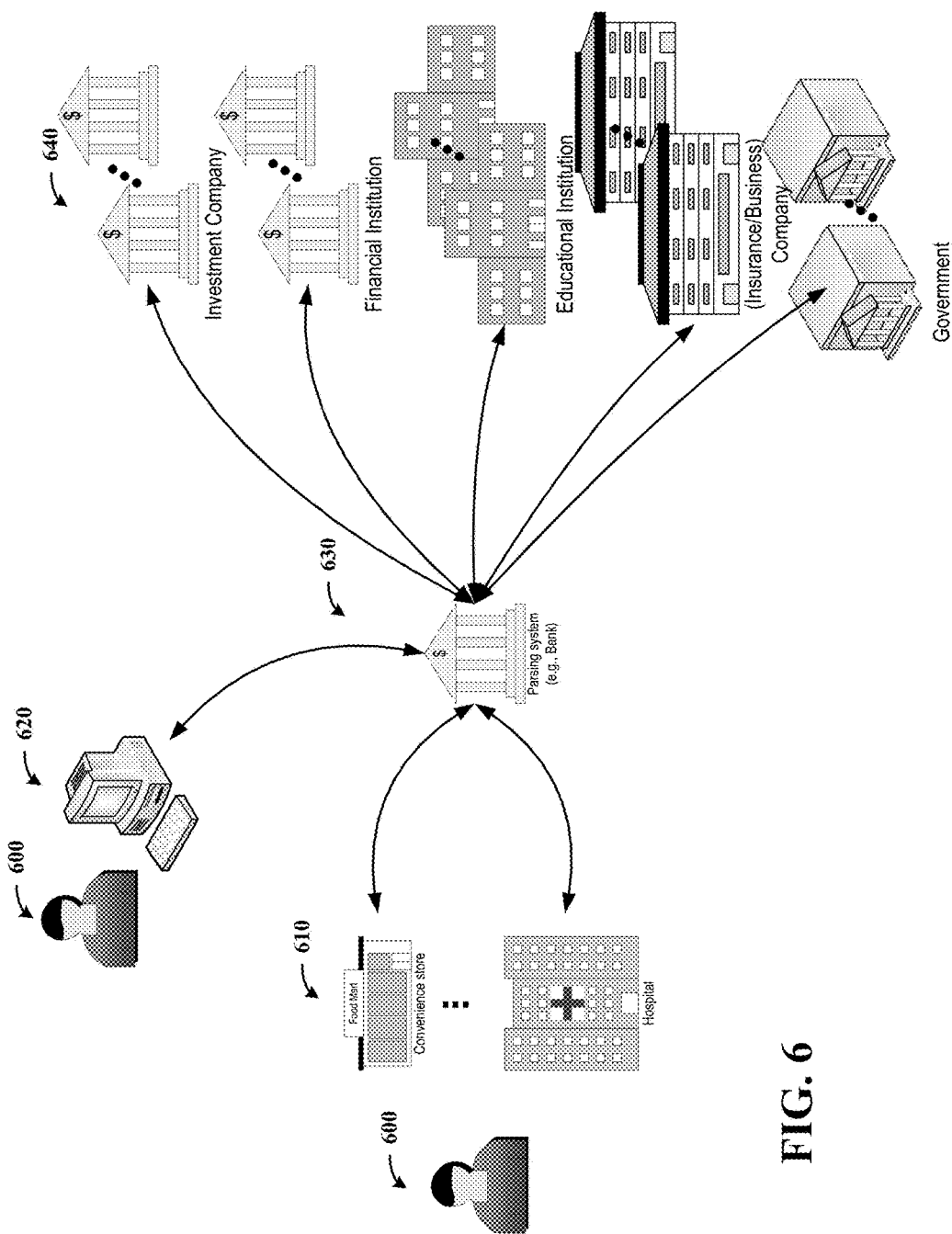
FIG. 6 is an example block diagram depicting various elements of an example system, implemented according to aspects of the present invention.

FIG. 6 shows a block diagram depicting various elements of a system implemented consistent with an example embodiment of the present invention. Sellers 610 provide various products or services to buyer 600. The transactional data is captured and sent to parsing system 630. Parsing system 630 parses the transaction data. The parsed transaction data can then be sent to selected buyer accounts provided by various institutions/companies 640. In certain embodiments the buyer 600 is allowed to access transaction data from the parsing system 630 using a network interface, such as a website or dedicated software.

The institutions/companies 640 shown are representative of a few examples including, but not limited to, investment companies, financial institutions, educational institutions, businesses and governmental institutions. Moreover, the provider of parsing system 630 may hold one or more buyer account types.

In a specific embodiment, the provider of parsing system 630 is a banking institution. Such institutions can be particularly well situated to provide the interfaces between varieties of different account providers.

A specific aspect of the present invention includes the selection of the buyer account for various parsed groups of items. In one implementation, buyer 600 can provide input (e.g., monitoring, confirmation or parsing selections) via a personal interface 620, such as a home computer. The selection is accomplished using one or more selection algorithms, which can be tailored to the specific implementation, current laws and regulations, the financial markets, current interest rates and a host of other parameters, some of which are subject to continual changes. As such, an exhaustive description of all such algorithms, related business rules, and possible input data would be impractical. An example set of business-rule data for various medical items is provided in Table 1.

TABLE 1

| Parsed Group | Cost | Medical | Service | Prescription | Predefined Rule | (Medical) Account# | Default Account# |
|---|---|---|---|---|---|---|---|
| Buyer-1 | | | | | | | |
| 1 | $100 | Y | N | Y | N | HSA#, Insurance# | Credit Card# |
| 2 | $30 | Y | Y | N | Y | HAS#, Insurance# | Credit Card# |
| Buyer-2 | | | | | | | |
| 1 | $3,000 | Y | Y | N | N | MSA#, Insurance# | Savings Account# |
| 2 | $100 | Y | N | Y | N | MSA#, Insurance# | Savings Account# |
| 3 | $320 | Y | N | Y | Y | MSA#, Insurance# | Savings Account# |

Table 2 shows an example set of business-rule data for various non-medical items.

TABLE 2

| Parsed Group | Cost | Medical | Personal | Business | Predefined Rule | Account# | Default Account# |
|---|---|---|---|---|---|---|---|
| Buyer-1 | | | | | | | |
| 3 | $250 | N | N | Y | N | Personal#, Business# | Credit Card# |
| 4 | $70 | N | Y | N | Y | Personal#, Business# | Credit Card# |
| Buyer-2 | | | | | | | |
| 4 | $2,322 | N | Y | N | N | Personal#, Business# | Savings Account# |
| 5 | $43 | N | N | Y | N | Personal#, Business# | Savings Account# |
| 6 | $75 | N | N | Y | Y | Personal#, Business# | Savings Account# |

As show in Tables 1 and 2, the transaction involving Buyer-1 has four parsed item groups and the transaction involving Buyer-2 has six parsed groups. Table 1 shows the medically-related groups for each buyer, whereas Table 2 shows the non-medically-related groups for each buyer. For each of the medically-related groups, the table includes data regarding the cost of the group and whether the group includes a service and/or a prescription. Other data includes whether a predefined rule exists for the group. Such predefined rules can be implemented as, for example, a rule setup by the buyer or rules dictated by laws or regulations. Table 1 also includes data regarding the Medical Account numbers, as well as a default account number. Table 2 contains non-medically related information, such as whether the group is personal or for business.

The business rules and related algorithms use the data in Tables 1 and 2 as inputs in the selection of a buyer account to associate with the particular group. Although not shown, buyer-specific data (e.g., account limits/balances, buyer selected preferences, buyer credit-history or other buyer data) can also be used in selection of a buyer account. Example algorithms include the use of (alone or in combination) lookup tables, statistical weighting of inputs, adaptive learning, calculations or predictions of the cost/fees, and/or predicted tax consequences.

For instance, the buyer account can be selected by accessing a lookup table in a database, where the lookup table is indexed by one or more of the data from the above tables.

The entries in the lookup table can be populated to be consistent with a set of business rules regarding transactions and the buyer accounts. In a specific example, a lookup table is initialized and/or modified according to data provided by one or more analytical/optimization algorithms. Sets of input data can be input into the algorithm(s). The output of the algorithm(s) can include the desired account type(s) for each set of input data. This results in a matching between each set and specific types of accounts. This matching can be used to populate or modify the lookup table. As the lookup table need not require that the algorithm be run, the need to execute the algorithm(s) for each buyer account selection can be alleviated. This can be particularly useful where the algorithm(s) are particularly complex and/or processing intensive. Where multiple algorithms are used, some algorithms may be tailored to different outcomes (e.g., maximize short/long-term gains, minimize tax implications, minimize fees or optimize gain/costs for certain/all parties). In a specific instance, different lookup tables can be set up for each algorithm. A specific lookup table can be selected according to the buyer-selected-profile (e.g., the buyer selects short term gain as an important factor). Alternatively, multiple lookup-tables can be used where multiple buyer accounts result from different lookup-tables, a selection can be made therefrom.

In a specific buyer-account-selection algorithm, data from the above tables is assigned a weight-factor. A computer implements an algorithm that uses the weighted data to determine the preferred account. This allows for certain data to be afforded more importance. The weight factors can represent priorities assigned to the different data inputs. These priorities can be determined, for example, from statistical data, the owner of the system, the buyer, the seller, providers of the buyer account, or combinations thereof.

In another buyer-account-selection algorithm, the algorithm uses a database of prior history to determine the buyer accounts. In a specific example, an unsupervised learning algorithm can be employed. The unsupervised learning algorithm takes all the data available and develops probabilistic models from the data. For example, one such algorithm may be used to determine the likelihood that a buyer will make a payment on-time. This can affect the desired account, as some accounts may charge higher penalties and/or interest rates. Should the desired result be a minimization of buyer costs and the buyer is deemed to be likely to make a late payment, the accounts can be selected accordingly.

Another example buyer-account-selection algorithm employs a supervised learning model. The algorithm develops a model to conform with sets of inputs that are matched to sets of outputs. This can provide a model for predicting any number of different outcomes (e.g., fees, chance of acceptance by account or delay time in processing) from the available input data (e.g., transaction amount, item descriptions or buyer account).

Both supervised and unsupervised modeling can be useful for continual updating of the models and the resulting selection of the buyer account made by the system. Particularly, as the system continues to operate, the database of knowledge can be updated accordingly. The updates to the database allow for modification of, for example, the buyer account selection. Such modeling can also be particularly useful for adding, removing or otherwise changing the input data or output data used in selecting a buyer account.

Figure 7:
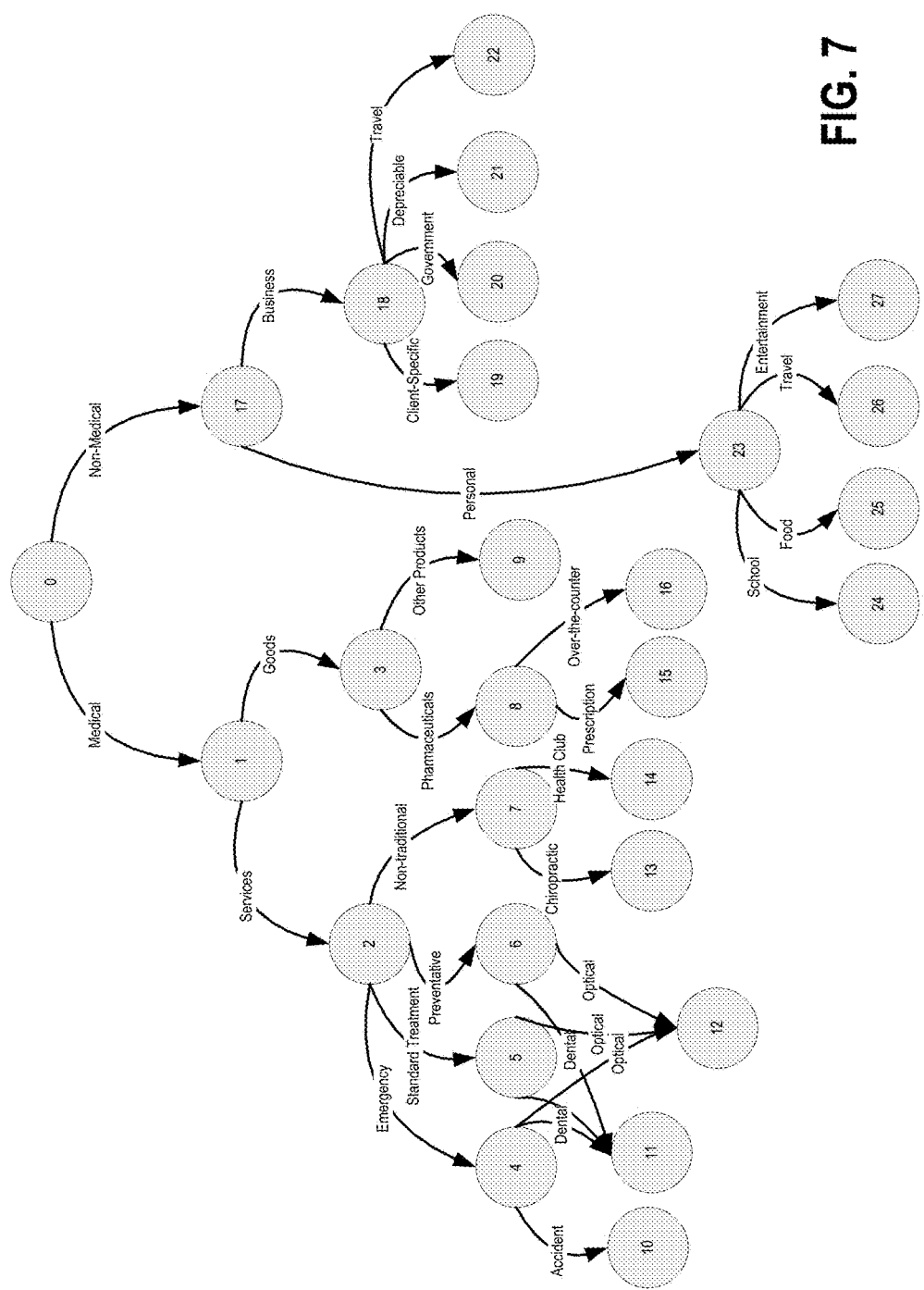
FIG. 7 is an example flow diagram illustrating an example process that can be used in connection with parsing of transaction items, also consistent with the present invention.

Another aspect of the invention involves the use of various methodologies to parse the transaction items. FIG. 7 shows an example flow diagram that can be used in connection with parsing of transaction items. The different nodes 1-27 represent different categories that may be relevant to grouping of the items. In a simplistic selection method, a single path is traversed for each item until the final node is reached. The final node represents the category for the item. For example, a prescription medication would follow the node path: 0=>1=>3=>8=>15. The prescription medication could then be grouped with other items that fall into node 15.

As shown in FIG. 7 (e.g., nodes 11 and 12), there may be several paths to reach the same node. In certain applications, the path used to reach the node may not be important. For applications that path information is important, this path data can be used in the final grouping. Thus, for the prescription medication example provided above, the node information could include the entire path set {0, 1, 3, 8, 15} or portions thereof. This data can be used in grouping the various items. In specific instances, a lookup table can be consulted to determine the grouping for each item. Thus, the path set {0, 1, 3, 8, 15} may point to a grouping N in a lookup table.

Certain items can follow more than one path or have more than one final node. For example, an item may be related to both travel (22) and government (20). Such situations can be handled in a number of different manners, one of which involves establishing priorities between the various nodes. A buyer account associated with a higher priority node can be used before those of a lower priority node. This can be particularly useful when implementing a recursive process, such as that discussed in connection with FIG. 5. For example, assume that a transaction group exists that relates to multiple nodes having different priorities. The system can first submit the transaction group to the buyer account associated with the highest priority node. Should this buyer account not provide a credit for the item or provide only partial credit for the item, a buyer account associated with a lower-priority node can be used.

Another possible mechanism for handling such situations involves using each of the nodes to select a buyer account. This can result in multiple buyer accounts being selected and used. As discussed in more detail above, multiple buyer accounts for the same group of items can be contacted in either a parallel fashion or a serial fashion and the transaction amount can be split between the buyer accounts or the full amount can be submitted to each buyer account.

Aspects of the parsing method are directed to how the system determines the proper categorization of each item. In a simple implementation, an identifier provides all details necessary to categorize and parse the items. Example identifiers include, but are not limited to, a UPC, an insurance code/descriptor and textual descriptions. While these identifiers contain specific information, they may or may not be known by the system prior to being received. For example, new products are continually reaching the market, and an exhaustive list of each new product would be, at best, difficult to maintain. Should the specific item be known with certainty, however, the categorization can be accomplished using a simple lookup of the categorization associated with the identifier. This can be particularly useful for items/applications for which a standardized identifier is used in the buyer-seller transaction.

For items where the transaction data does not lend itself to a simple lookup procedure (e.g., new products or unknown/uncertain product identifiers), various other methods can be used. One method involves categorization of such items and using the categorization to populate a lookup table as transaction data. For example, a previously unknown identifier or combination of transaction data is first compared against the lookup table. Assuming that the lookup table does not have an entry for the identifier, categorization can be determined for the identifier. Once a categorization is known, the lookup table can be populated accordingly.

One example method for determining the proper categorization is to allow the buyer to select a proper categorization. The buyer could select the categorization using an online interface such as a website or other software configured to interface with the system. The buyer can provide such an indication by explicitly selecting a certain category. Alternatively, the buyer can answer a set of questions regarding the specific item and related transaction. The set of questions can be provided by the system and tailored to correctly categorize the item. Such questions can be particularly useful for properly categorizing the item(s) without requiring the buyer to know the proper rules behind each categorization.

Another example method for determining the proper categorization is to use prediction algorithm(s) to determine the most likely categorization. For instance, these algorithms can use a variety of textual recognition and/or draw from a database of past categorizations based upon similar transaction data. Both supervised and unsupervised learning algorithms could be employed to predict the proper categorization.

In certain instances an item may be improperly categorized. This could be detected, for example, where the selected buyer account holder rejects the item or where the buyer corrects the categorization. The system can use this data to update accordingly, including updates to any lookup tables or prediction models.

While the particular parsing tree of FIG. 7 uses medical and nonmedical as the first parsing level, the invention is not so limited. Additional and/or different parsing selections can also be implemented.

The various embodiments describe herein can be implemented using one or more processors running software configured to implement various functions described herein. The system allows for modularity in a number of aspects including the interfaces between the various components. The specific code and algorithms for implementing many of the functions would depend upon the particulars of implementation. For example, an Internet-based sale may use secure-socket-layer protocols. A seller interface using a credit/debit transaction card reader at the point-of-sale device might use protocols consistent with various transaction processing networks (e.g., Nabanco, Omaha, Paymentech, NDC Atlanta, Nova, Vital, Concord EFSnet, and VisaNet). The various buyer accounts may use a variety of (in some cases proprietary) protocols and standards. Moreover, these and other standards are often subject to continual updates and changes. As such, a discussion of each individual protocol and implementation is not practical. The skilled artisan would recognize that these and other variations do not depart from the heart of the invention.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, such changes may include the implementation of various components by different entities that may or may not operate at arms length from one another. Such modifications and changes do not depart from the true spirit and scope of the present invention.

The invention claimed is:

1. A computer system comprising one or more computer processors that include:
   a memory circuit configured and arranged to provide a database, wherein the database is configured with a payment processor that is connected to a plurality of point-of-sale credit-debit card readers and that is configured to:
      receive transaction data from the point-of-sale credit-debit card readers, the transaction data identifying a plurality of items being purchased by a single buyer, and parse the plurality of items being purchased by:
         identifying a plurality of buyer networks held by a buyer corresponding to an identifier associated with the single buyer; and
         tagging each item in the transaction data as eligible for one or more types of buyer networks, wherein the types of buyer networks include a health insurance network; and
   the database configured with a transaction processor that is configured to:
      receive the tagged items from the payment processor;
      select, for each tagged item, a respective buyer network from the plurality of networks by correlating the eligible types of buyer networks with the plurality of buyer networks held by the buyer, sorting the plurality of buyer networks that match the eligible types of buyer networks, and selecting the respective buyer network based upon the sorting;
      submit, based upon the selected respective buyer networks, a first set of the plurality of items being purchased as part of an insurance claim to a health insurance network;
      submit, based upon the selected respective buyer networks, a second set of the plurality of items being purchased to a credit card network; and
      provide the selected respective buyer network and the credit card network, identification of computing protocols to use to allow transaction settlement between the selected respective buyer network and the credit card network.

2. The system of claim 1, wherein the transaction processor is further configured to store an approval status of the first set of items from the plurality of items in a pending transaction warehouse database.

3. The system of claim 2, wherein the transaction processor is further configured to receive status updates from the health insurance network, and to submit, in response to the status updates indicating a denial of at least part of the first set of items, the denied part of the first set of items to the credit card network.

4. The system of claim 2, wherein the transaction processor is further configured to receive status updates from the health insurance network, and to submit, in response to the status updates indicating a denial of at least part of the first set of items, the denied part of the submitted first set of items to a health savings account (HSA) network.

5. The system of claim 1, wherein the transaction processor is further configured to provide payment to a seller for the first set of items, the payment provided prior to receipt of an approval status from the health insurance network.

6. The system of claim 5, wherein the transaction processor is further configured to provide the payment by debiting a suspense account.

7. The system of claim 6, wherein the transaction processor is further configured to credit the suspense account in response to receiving payment from the health insurance network.

8. A method for use in a transaction between a seller and buyer that involves a plurality of items and transaction data that includes information about a cost of each item and a description of each item, the method comprising:
    using a payment processor of a computer that is connected to a plurality of point-of-sale credit-debit card readers to:
        receive transaction data from the point-of-sale credit-debit card readers, the transaction data identifying a plurality of items being purchased by a single buyer and parse the plurality of items being purchased by:
            identifying a plurality of buyer networks held by a buyer corresponding to an identifier associated with the single buyer; and
            tagging each item being purchased as eligible for one or more types of buyer networks, wherein the types of buyer networks include a health insurance network; and
    using a transaction processor of the computer to:
        receive the tagged items from the payment processor;
        select, for each tagged item, a respective buyer network from a plurality of accounts by correlating the eligible types of buyer networks with the plurality of buyer networks held by the buyer, sorting the plurality of buyer networks that match the eligible types of buyer networks, and selecting the respective buyer network based upon the sorting;
        submit, based upon the selected respective buyer networks, a first set of the plurality of items being purchased as part of an insurance claim to a health insurance network;
        submit, based upon the selected respective buyer networks, a second set of the plurality of items being purchased to a credit card network; and
        provide the selected respective buyer network and the credit card network, identification of computing protocols to use to allow transaction settlement between the selected respective buyer network and the credit card network.

9. The method of claim 8, further comprising using the transaction processor to store an approval status of the first set of items from the plurality of items in a pending transaction warehouse database.

10. The method of claim 9, further comprising using the transaction processor to receive status updates from the health insurance network, and to submit, in response to the status updates indicating a denial of at least part of the first set of items, the denied part of the first set of items to the credit card network.

11. The method of claim 9, further comprising using the transaction processor to receive status updates from the health insurance network, and to submit, in response to the status updates indicating a denial of at least part of the first set of items, the denied part of the submitted first set of items to a health savings account (HSA) network.

12. The method of claim 8, further comprising using the transaction processor to provide payment to the seller for the first set of items, the payment provided prior to receipt of an approval status from the health insurance network.

13. The method of claim 12, further comprising using the transaction processor to provide the payment by debiting a suspense account.

14. The method of claim 13, further comprising using the transaction processor to credit the suspense account in response to receiving payment from the health insurance network.

15. A computer system comprising one or more computer processors that include:
    a memory circuit configured and arranged to provide a database, wherein the database is configured with a payment processor that is connected to a plurality of point-of-sale credit-debit card readers and that is configured to:
        receive transaction data from the point-of-sale credit-debit card readers, the transaction data identifying a plurality of items being purchased by a single buyer, and parse the plurality of items being purchased by:
            identifying a plurality of buyer networks held by a buyer corresponding to an identifier associated with the single buyer; and
            tagging each item being purchased as eligible for one or more types of buyer networks, wherein the types of buyer networks include a health insurance network; and
    the database configured with a transaction processor that is configured to:
        receive the tagged items from the payment processor;
        select, for each tagged item, a respective buyer network from the plurality of networks by correlating the eligible types of buyer networks with the plurality of buyer networks held by the buyer, sorting the plurality of buyer networks that match the eligible types of buyer networks, and selecting the respective buyer network based upon the sorting;
        submit, based upon the selected respective buyer networks, a first set of the plurality of items being purchased as part of an insurance claim to a health insurance network;
        submit, based upon the selected respective buyer networks, a second set of the plurality of items being purchased to a credit card network;
        store an approval status of the first set of items from the plurality of items in a pending transaction warehouse database; and
        provide payment to a seller for the first set of items, the payment provided prior to receipt of an approval status from the health insurance network.

16. A method for use in a transaction between a seller and buyer that involves a plurality of items and transaction data that includes information about a cost of each item and a description of each item, the method comprising:
    using a payment processor of a computer that is connected to a plurality of point-of-sale credit-debit card readers to:
        receive transaction data from the point-of-sale credit-debit card readers, the transaction data identifying a plurality of items being purchased by a single buyer and parse the plurality of items being purchased by:
            identifying a plurality of buyer networks held by a buyer corresponding to an identifier associated with the single buyer; and
            tagging each item being purchased as eligible for one or more types of buyer networks, wherein the types of buyer networks include a health insurance network; and
    using a transaction processor of the computer to:
        receive the tagged items from the payment processor;
        select, for each tagged item, a respective buyer network from a plurality of accounts by correlating the eligible types of buyer networks with the plurality of buyer networks held by the buyer, sorting the plurality of buyer networks that match the eligible types of buyer networks, and selecting the respective buyer network based upon the sorting;

submit, based upon the selected respective buyer networks, a first set of the plurality of items being purchased as part of an insurance claim to a health insurance network;

submit, based upon the selected respective buyer networks, a second set of the plurality of items being purchased to a credit card network;

store an approval status of the first set of items from the plurality of items in a pending transaction warehouse database; and provide payment to the seller for the first set of items, the payment provided prior to receipt of an approval status from the health insurance network.

* * * * *